Sept. 12, 1967   R. A. HEISLER   3,340,718
ONE-PIECE ELECTRODE
Filed March 4, 1965

INVENTOR.
RAYMOND A. HEISLER
BY
Ralph R Roberts
AGENT

United States Patent Office 3,340,718
Patented Sept. 12, 1967

3,340,718
ONE-PIECE ELECTRODE
Raymond A. Heisler, Dakota Trail,
Franklin Lakes, N.J. 07417
Filed Mar. 4, 1965, Ser. No. 437,178
3 Claims. (Cl. 72—377)

ABSTRACT OF THE DISCLOSURE

A one-piece metal alloy electrode as used in gun-type oil burner ignition systems, said electrode having a tip end of reduced diameter which is secured by the method of cold forming as by swaging or hammering and with working the tip surface to produce an electrode tip having a superior resistance to cratering or erosion.

This invention relates to electrodes and in particular to those primarily used in igniter systems for gun-type oil burners. Even more particularly this invention relates to the method of making and to the electrodes known as light duty electrodes.

Even more particularly this invention relates to an electrode formed from one piece of metal and to the method of forming the tip portion thereof by swaging so as to produce a tip having a high resistance to the erosion caused by electrical discharge and the products of oil combustion.

Light duty electrodes are most commonly found in heating systems for the home and in the production of these electrodes for use in the igniting systems required in gun-type oil burners it has been the general practice to make the electrode as inexpensively as possible, such electrodes being usually of two pieces and two materials. The shank portion of the two piece electrode is usually of steel, brass or similar inexpensive metal while the tip portion is of some alloy metal such as stainless steel which more expensive metal has a higher resistance to the cratering and erosion caused by electrical discharge and combustion. This two-piece electrode assembly does not have the degree of reliability and service life desired since the weld holding the tip to the shank often fails after a period of use and further the tip made of "as drawn" alloy metal itself does not have the desired resistance to erosion and cratering to provide the durability of service required.

It is one object of this invention to provide an electrode and the method of making this electrode of a one-piece construction and to provide a tip portion with a surface treated by swaging means to give superior resistance to erosion and cratering caused by electrical discharge and combustion. It is a further object of this invention to produce an electrode of one-piece construction which requires less material, can be made by less labor and results in superior qualities and a high degree of reliability.

In the attainment of these and other objects it is contemplated to produce a superior one-piece electrode and provide a method of production for this electrode in which the shank and tip are formed from a single piece of metal and in which the tip portion is reduced in diameter and is caused to be extended by swaging a portion of the electrode material. In the same process in which this tip is formed the "grain" of the metal which is "cold-worked" is refined or compacted to improve its electrical current carrying characteristics while the surface of the tip is "work-hardened" by cold hammering to produce a tip having a high degree of reliability and superior resistance to erosion from the action of electrical discharge and from the effects of combustion of the oil fire.

There has thus been outlined rather broadly the most important features of the present invention in order that a detailed description thereof that follows may be better understood and in order that the present contribution to the art may be better appreciated. There are, of course, additional features of the invention that will be described hereinafter and which will form the subject of claims appended hereto. Those persons skilled in the art will appreciate that the conception on which the present disclosure is based may readily be utilized as the basis for designing other structures for carrying out the several purposes of this invention. It is important, therefore, that the claims be regarded as including such equivalent constructions as do not depart from the concept and scope of this invention.

A specific embodiment of the invention has been chosen for purposes of illustration and description, and is shown in the accompanying drawing forming a part of the specification wherein.

Figure 1:
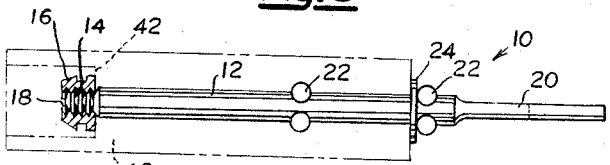
FIG. 1 represents a plan view of the electrode of this invention as assembled into an electrode holder, the holder being shown in phantom outline.
Figure 2:
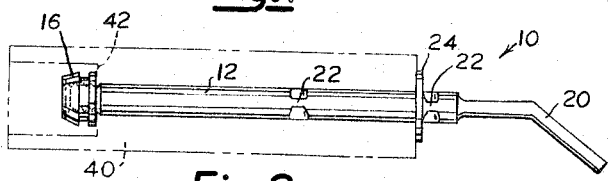
FIG. 2 represents a side view of the electrode of FIG. 1 with the holder being shown in phantom outline.

Referring now particularly to the drawing wherein similar characters designate corresponding parts throughout, the general arrangement forming the preferred embodiment of the electrode of one-piece construction is shown in particular in FIGS. 1 and 2 wherein the unitary electrode is designated 10. A shank portion 12 has the inner or connecting end formed with a thread portion 14 adapted to accept and retain a nut 16 conventionally having a screw-driver slot 18 in its one end.

The forward end of the electrode has a reduced portion 20 which may have a substantial end portion bent from the common axis of the electrode. This bent end portion is bent at a selected angle to provide a predetermined spark-gap or spacing with a similarly mounted electrode. This bending of the exterior tip may be either accomplished at the time of manufacture of the electrode or by a service man at the time of installation in the field. Adjacent the reduced end portion 20 of the electrode there is formed in the shank portion 12 one or more shoulder lip portions 22. As reduced to practice, these portions are formed by placing the shank 12 in a die (not shown) and bringing oppositely disposed round punches toward each other until the punches are about sixty- or seventy-thousandths of an inch from each other. These punches are adapted to engage opposed side portions of the shank 12 and when brought together in the manner described above to extrude portions of the shank into protuberant shoulder portions 22, as shown. These shoulder portions are of a predetermined thickness as determined by the controlled amount of movement of the punches toward each other, the thickness usually being about seventy-thousands of an inch thick. In the present embodiment and for an assembly purpose to be hereinafter described, there is placed on shank 12 a shoulder washer 24. This washer is placed on the shank before the forming of the shoulder portions 22 so that when the shoulders 22 are formed the washer 24 is captured between the two pairs of shoulders 22. It is to be further noted that the washer 24 when urged forwardly against the rear or inner portions of the forward shoulders 22 provides a circular shoulder at right angles to the axis of the shank 12. The assembly and use of the electrode will be hereinafter described.

Figure 6:
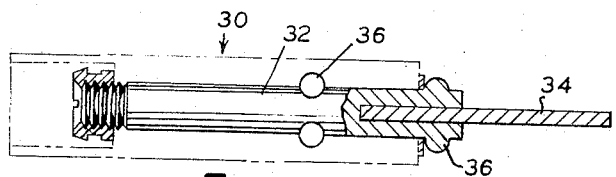
FIG. 6 represents a plan view partially in section and showing the manner of assembly of a conventional two-piece electrode.
Figure 7:
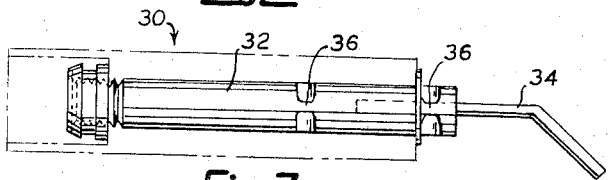
FIG. 7 represents a side view of the two-piece electrode of FIG. 6 with the electrode holder shown in phantom outline.

It is to be noted in FIGS. 6 and 7 that a two-piece electrode 30 has of necessity a shank 32 of sufficient diameter to permit the drilling of a hole in one end, the hole being adapted to accept the diameter of the reduced tip portion 34. This tip portion 34 is usually silver-soldered or welded in place in the shank 32. When tip portion 34 is made about one-sixteenth of an inch in diameter the shank 32 may be made about three-sixteenths of an inch in diameter. This diameter permits shoulder portions 36 to be formed in the shank 32 in a manner described above in the forming of shoulders 22 in shank 12.

In the present embodiment of my invention, I provide an electrode whose shank 12 is less than one-eighth inch diameter and whose tip 20 may be about one-sixteenth inch in diameter but which is often made much less since the resistance to erosion is so much improved. Having no soldered or welded joints as in mounting tip 34 in shank 32 the electrode of my invention has no possibility of electrical resistance building up in such a joint.

Figure 3:
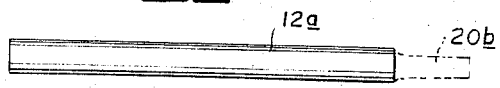
FIG. 3 represents a cut piece of metal rod with a partially reduced tip portion thereof being shown in phantom outline.
Figure 4:
FIG. 4 represents the cut piece of metal rod of FIG. 3 with the partially reduced tip portion being shown in phantom outline and further reduced in diameter and extended in length.
Figure 5:
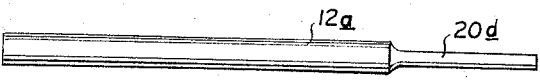
FIG. 5 represents a cut piece of metal rod with the reduced tip portion in finished diameter and length.
Figure 5A:
FIG. 5A represents a fragmentary reduced tip end portion of the rod of FIG. 5 but with the end rounded.

In FIGS. 3, 4 and 5 is illustrated the sequence method of making the reduced tip end 20 of the electrode 10. In FIG. 3 a metal rod 12a has had an end portion 20b reduced slightly in diameter. This reduction can be done by swaging in a die or by cold forging by a hammer. As the reduction in diameter is made the metal that is thus displaced flows forward. In FIG. 4 the end portion is further reduced in diameter to the diameter shown as 20c by cold forging blows such as performed by apparatus such as by a "Torrington Rotary Swager" or similar means. As the tip portion is further reduced the metal displaced flows even further forward. In FIG. 5 the metal rod 12a has its tip reduced from 20c to the final diameter 12d which swaging has caused the displaced metal in the tip to flow even further forward as indicated in this FIG. 5. As this reducing operation is preferably done in swaging dies the end of the reducing tip may be rounded as in 20e as seen in FIG. 5A. It is to be noted that a reduced diameter 20d or 20e could be dimensionally produced by turning down a portion of a rod having the diameter of 12a, however the electrode so produced will not have the characteristics desired and produced in the method exemplified in FIGS. 3–5.

The positive displacement of the metal in the forming of tip 20d by a series of hammer blows in forming dies or other means and in the absence of additional heat results in a "work-hardening" or "cold-working" of the metal in the tip portion 20d or 20e to produce a closer grained metal core having a superior surface treatment and hardness. As reduced to practice and proved by comparison tests, the work hardened tip portion 20 is able to operate with comparable resistance to corrosion, erosion and cratering as in a conventional tip but with the voltage in my improved tip being at least ten percent above the normal voltage used in the conventional tip. At essentially the same voltages and producing the same quality and type of spark the work hardened tips 20 of my single piece electrode as compared with my non-hardened tip portion 34 results in an operational life extension of ten to fifty percent in favor of the hardened tips 20 of the single piece electrode.

The metal used to provide the superior electrical conducting and surface resistance in the electrode 10 may be selected from stainless steels of the types AISI 302, 303, 305, 430 and 430–F as well as metal alloys known by trade names "Kanthal," "Nichrome V" as supplied by Driver-Harris Co., "Chromel AA" as supplied by Hoskins Co., and other metals of similar types. All of these metals are brought to the annealed condition before the swaging operation is begun by which to form the end 20d.

It is to be further noted that the lesser diameter of shank 12 than that of conventional shank 32 permits a heavier insulating wall to be used in an electrode holder 40. This heavier wall provides either a better insulation of the electrode 10 from the furnace wall and/or permits the holder 40 to be made of a less expensive ceramic material of a lesser insulating quality.

Use and operation

Ceramic holder 40 is conventionally made with a passageway formed to slidably accept the circular diameter of shank 12. Longitudinal grooves are also formed in the passageway, these grooves being adapted to accept the protuberant shoulders 22. A shouldered relief 42 formed on the rear end of the passageway in holder 40 provides a place for the attachment of a wire head not shown. The wire is placed under nut 16 and the nut tightened on threads 14 which draws washer 24 into engagement with the forward or front end of holder 40. The holder 40 is rotated in the firewall to position two electrodes 10 so that the ends of tips 20e are in the desired spacing.

Method of forming the electrode

The steps used in making the electrode of this invention include: cutting a bar of metal of preselected diameter to a predetermined length; reducing the diameter of an end portion of the bar by cold hammering said end portion to reduce the diameter and to cause the displaced metal to flow forwardly; cold working the surface of the reduced diameter to harden this surface to resist erosion by electrical discharge; forming the other end of the shank to receive an electrical connection; and forming shouldered lip portions on the shank to provide retaining means for mounting of the electrode in the electrode holder.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described our invention herein, what I claim as new and desire to secure by Letters Patent is:

1. The method of forming an electrode of one-piece construction for use in an igniter system such as is used in oil-burners and the like, the steps including:
   (1) cutting a bar of metal alloy of preselected diameter to a predetermined length;
   (2) forming an electrical conductor attaching means on one end of the bar;
   (3) reducing and extending the end and adjacent portion of the other end of the bar by cold hammering this end portion to reduce this diameter of the bar and to cause the displaced metal to flow forwardly;
   (4) cold working the surface of the reduced diameter to harden this surface of the tip to resist erosion by electrical discharge; and
   (5) forming shouldered lip portions on the shank to provide retaining means for mounting of the electrode in an electrode holder.

2. The method of forming an electrode as in claim 1 wherein the step of reducing and extending the end bar portion includes hammering this end portion in a die means.

3. The method of forming an electrode of one-piece construction for use in an igniter system such as is used in oil burners and the like, the steps including:
   (1) cutting a bar of annealed metal alloy of preselected diameter to a predetermined length;
   (2) forming a thread on one end of the bar;

(3) swaging in die forms the other end of the bar so as to reduce and extend an end portion of the bar, said swaging being done in successive steps;

(4) cold hammering this reduced tip end portion to harden this surface to improve the resistance of this surface to resist erosion by electrical discharge; and (5) forming shouldered lip portions on the shank to provide retaining means for mounting of the electrode in an electrode holder.

References Cited

UNITED STATES PATENTS

| | | |
|---|---|---|
| 1,805,124 | 5/1931 | Wilcox. |
| 1,993,580 | 3/1935 | Abbott _____ 29—155.5 |
| 2,984,731 | 5/1961 | Bradshaw et al. _____ 219—145 |

CHARLES W. LANHAM, *Primary Examiner.*

E. M. COMBS, *Assistant Examiner.*